Jan. 10, 1928.

A. F. LEW 1,656,071

VULCANIZING DEVICE

Filed Dec. 11, 1925

Albert F. Lew,
INVENTOR

BY Victor J. Evans
ATTORNEY

Patented Jan. 10, 1928.

1,656,071

UNITED STATES PATENT OFFICE.

ALBERT F. LEW, OF BAKER, OREGON.

VULCANIZING DEVICE.

Application filed December 11, 1925. Serial No. 74,859.

The object of this invention is to provide means for vulcanizing tire tubes, especially where splices or uneven surfaces are encountered.

A further object is to provide a vulcanizing device with an element affording an air chamber, in order that both mechanical pressure and fluid pressure may be available.

A further object is to provide, in a device of this type, an upper block with flexible air-proof walls defining an air chamber adapted to distribute the pressure evenly over that portion of the work which at a given time may be on the heated vulcanizing element.

With the foregoing and other objects in view, the invention consists in the novel construction and arrangement of elements described, illustrated and claimed, it being understood that modifications may be made within the scope of the claim, without departing from the spirit of the invention.

In the drawings forming part of this application,

Figure 1:
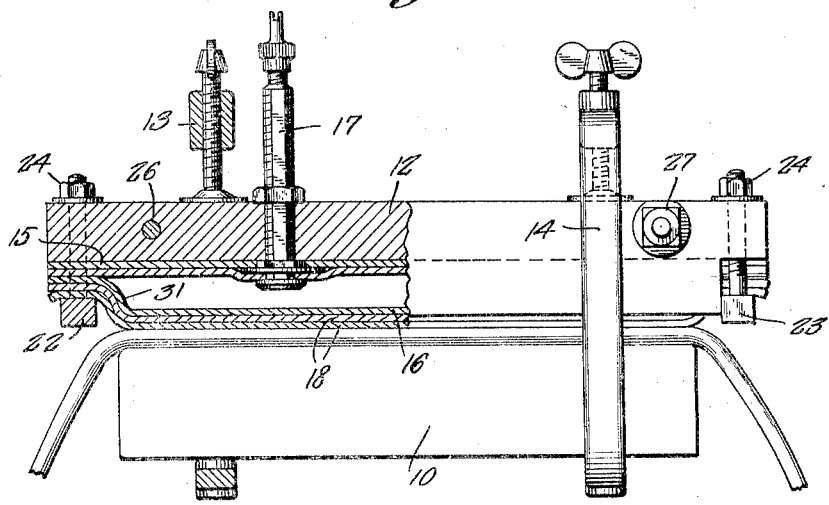
Figure 1 shows the device in elevation and in longitudinal section.
Figure 2:
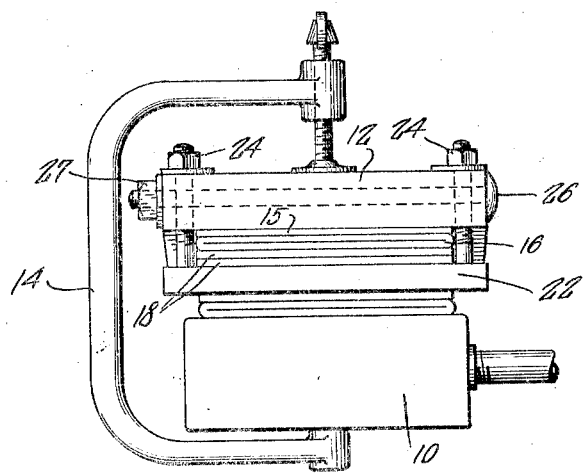
Figure 2 is a view in elevation, from another angle.

The lower block, on which the work rests, and which is adapted to be heated, is designated 10, and the tube to be repaired is placed on the block 10 with the damaged portion next to the block.

An upper wood block, or block formed of suitable material, is designated 12, and clamps 13 and 14 serve the usual purpose, in applying mechanical pressure.

Connecting with upper block 12 is a thickness of sheet rubber designated 15, and below this element 15 is another thickness of rubber, which may consist of a section of a used rubber tube, with the stem 17 of the air valve still attached. The layer of sheet rubber last referred to is shown at 16, and a plurality of additional layers 18 are provided, all of these layers or sheets being retained by bolts 22 and 23 and nuts such as 24. Passing through the block 12 are other bolts 26 engaged by nuts 27.

The lower walls of the air chamber expand under air pressure, and produce the deflected portion shown at 31, when air is introduced through valve stem 17, the fluid pressure supplementing the mechanical pressure, and producing, in practice, highly satisfactory results, especially where difficult conditions are encountered.

What is claimed is:

A device of the character described, comprising an upper block, flexible means connected with the under side thereof providing an air chamber, devices for effecting this connection, an inlet connection for the chamber, a lower block movable to position within the secured edges of the flexible means, and devices for connecting the blocks and applying mechanical pressure thereto.

In testimony whereof I affix my signature.

ALBERT F. LEW.